(12) United States Patent
Chen et al.

(10) Patent No.: US 11,188,210 B2
(45) Date of Patent: *Nov. 30, 2021

(54) UNIFIED REAL TIME RULE ANALYTICS USING COMMON PROGRAMMING MODEL ON BOTH EDGE AND CLOUD

(71) Applicant: International Business Machines Corporation, Armonk, NY (US)

(72) Inventors: Yao Liang Chen, Shanghai (CN); Sheng Huang, Shanghai (CN); Yun Jie Qiu, Shanghai (CN); Xinlin Wang, Irvine, CA (US); Xiao Min Xu, Shanghai (CN); Chao Hua Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 434 days.

This patent is subject to a terminal disclaimer.

(21) Appl. No.: 15/818,181

(22) Filed: Nov. 20, 2017

(65) Prior Publication Data

US 2018/0373419 A1 Dec. 27, 2018

Related U.S. Application Data

(63) Continuation of application No. 15/629,180, filed on Jun. 21, 2017.

(51) Int. Cl.
*G06F 3/0484* (2013.01)
*H04L 29/08* (2006.01)
(Continued)

(52) U.S. Cl.
CPC ......... *G06F 3/04847* (2013.01); *G06N 5/022* (2013.01); *G06N 5/025* (2013.01);
(Continued)

(58) Field of Classification Search
CPC .......... G06F 3/147; G06F 9/5072; G06F 8/00; G06F 8/70; G06F 9/542; G06F 21/604;
(Continued)

(56) References Cited

U.S. PATENT DOCUMENTS 8,449,976 B2 5/2013 Manifold et al.
8,977,600 B2 * 3/2015 Crupi .................... G06F 16/951
707/688

(Continued)

OTHER PUBLICATIONS

"IBM Edge Analytics Agent (EAA)" (part of the IBM Watson IoT Real Time Insight (RTI) Edge Component) at https://console.ng.bluemix.net/docs/services/IoT/edge_analytics.html, Printed Jun. 21, 2017, pp. 1-13.

(Continued)

*Primary Examiner* — Alex Gofman
*Assistant Examiner* — Linh Black
(74) *Attorney, Agent, or Firm* — Scully, Scott, Murphy & Presser, PC; Joseph Petrokaitis, Esq.

(57) ABSTRACT

The system, method, and computer program product described herein provide unified real-time rule analytics to users through the use of an analytics logic editor that allows a user to construct an analytic logic rule unit that may be used on both edge and cloud devices. The user may select a data source, transform, rule condition, and action using an interface of the analytics logic editor to construct an analytics logic rule unit that may be deployed to both edge and cloud devices in real-time without the need to separately program each device. The analytics logic rule unit may be installed and executed by the edge and cloud device in real-time.

12 Claims, 13 Drawing Sheets

(51) Int. Cl.
*G06N 5/02* (2006.01)
*H04W 4/12* (2009.01)
*H04W 4/70* (2018.01)
*G06F 3/0482* (2013.01)
*G06N 5/04* (2006.01)

(52) U.S. Cl.
CPC .............. *H04L 67/10* (2013.01); *H04L 67/22* (2013.01); *H04W 4/12* (2013.01); *H04W 4/70* (2018.02); *G06F 3/0482* (2013.01); *G06N 5/045* (2013.01)

(58) Field of Classification Search
CPC ... G06F 16/90335; G06F 30/20; G05B 19/18; G06Q 10/10
USPC ........ 707/600–602, 694, 706–707, 712, 756, 707/807–809
See application file for complete search history.

(56) References Cited

U.S. PATENT DOCUMENTS

| | | | |
|---|---|---|---|
| 9,251,465 B2* | 2/2016 | Cox | G06Q 40/06 |
| 10,007,513 B2* | 6/2018 | Malladi | G06F 8/70 |
| 10,019,538 B2* | 7/2018 | Kartha | G06F 16/9024 |
| 10,097,698 B2* | 10/2018 | Sharma | H04L 45/22 |
| 10,216,485 B2* | 2/2019 | Misra | G06F 8/60 |
| 10,353,379 B2* | 7/2019 | Meier | G05B 19/41885 |
| 2005/0102273 A1* | 5/2005 | Gupta | G06F 16/24573 |
| 2008/0049013 A1 | 2/2008 | Nasle | |
| 2009/0113384 A1* | 4/2009 | Kosov | G06F 8/34 717/105 |
| 2011/0200052 A1* | 8/2011 | Mungo | H04L 67/20 370/401 |
| 2013/0262645 A1 | 10/2013 | Akchurin et al. | |
| 2014/0040433 A1* | 2/2014 | Russell, Jr. | H04N 21/23418 709/219 |
| 2014/0180711 A1* | 6/2014 | Kamen | G16H 20/10 705/2 |
| 2014/0365240 A1 | 12/2014 | Canton | |
| 2014/0372971 A1* | 12/2014 | Shankar | G06F 8/34 717/106 |
| 2015/0100943 A1* | 4/2015 | Gabel | G06F 8/30 717/106 |
| 2015/0120644 A1 | 4/2015 | Eberhardt, III et al. | |
| 2015/0142673 A1* | 5/2015 | Nelsen | G06Q 20/405 705/76 |
| 2016/0098402 A1* | 4/2016 | Filippi | G06F 11/0751 707/722 |
| 2016/0134934 A1* | 5/2016 | Jared | H04N 21/44213 725/14 |
| 2017/0006135 A1* | 1/2017 | Siebel | G06F 9/5072 |
| 2017/0093667 A1 | 3/2017 | Thirumoorthy et al. | |
| 2017/0093700 A1* | 3/2017 | Gilley | H04L 63/20 |
| 2017/0126741 A1* | 5/2017 | Lang | G06F 21/604 |
| 2017/0212482 A1 | 7/2017 | Boettcher et al. | |
| 2017/0236067 A1* | 8/2017 | Tjiong | G06F 3/048 706/11 |
| 2017/0250881 A1* | 8/2017 | Kellicker | H04L 43/106 |
| 2017/0351241 A1* | 12/2017 | Bowers | G06N 5/022 |
| 2018/0001184 A1* | 1/2018 | Tran | A63B 43/004 |
| 2018/0246502 A1* | 8/2018 | Meier | G06Q 10/06 |

OTHER PUBLICATIONS

List of IBM Patents or Patent Applications Treated as Related.
Office Action dated Jan. 13, 2020 received in a related U.S. Appl. No. 15/629,180.
Notice of Allowance dated Sep. 16, 2021 from related application U.S. Appl. No. 15/629,180.

* cited by examiner

Devices

Browse | Diagnose | Action | Device Types | Manage Schemas

| | | Device ID ⇕ | Device Type ⇕ | Class ID ⇕ | Date Added |
|---|---|---|---|---|---|
| ☐ | 🖧 | SysSensor | sys_VM | Device | Aug 1.2016 4:53:48 PM |
| ☐ | 🖧 | mySensor1 | EngineSensors | Device | Aug 3.2016 4:44:18 PM |
| ☐ | 🖧 | mySensor2 | EngineSensor2 | Device | Aug 1.2016 5:11:50 PM |
| ☐ | ⚠ | gateway1_xw | GATEWAY | Gateway | Aug 1.2016 4:43:07 PM |
| ☐ | 🖧 | mySensor3 | EngineSensors | Device | Aug 3.2016 4:44:18 PM |
| ☐ | 🖧 | mySensor4 | EngineSensor2 | Device | Aug 1.2016 5:16:18 PM |

300

Results 1-6 OF 6

| Payload Name 412 | Edge Label 414 |
| --- | --- |
| Humidex | Humidex |

Type

String ▼ ← 416

Advance (>)

Calculation Event Type: Status

424 — Payload Value
= | xaxis : | x : | 2 : |   420    ☒☑

418 — Payload Property | Value | + | − | ÷ | x | { | } ⎬ 422

| Notation | Averaging | Smoothing | Math | Forecasting |
|---|---|---|---|---|
| 402 | 404 | 406 | 408 | 410 |

Exponential

Auto Smoothing

Box

Find out more ✎

Cancel   Add

UNIFIED REAL TIME RULE ANALYTICS USING COMMON PROGRAMMING MODEL ON BOTH EDGE AND CLOUD

STATEMENT REGARDING PRIOR DISCLOSURES BY THE INVENTOR

The following disclosure(s) are submitted under 35 U.S.C. 102(b)(1)(A): DISCLOSURE(S): (1) "IBM Edge Analytics Agent (EAA)" (part of the IBM Watson IoT Real Time Insight (RTI) Edge Component)"; Aug. 11, 2016 at https://console.ng.bluemix.net/docs/services/IoT/edge_analytics.html.

BACKGROUND

The present disclosure relates to analytics on edge and cloud devices.

BRIEF SUMMARY

The system, method, and computer program product described herein provide unified real-time rule analytics to users through the use of an analytics logic editor that allows a user to construct an analytic logic rule unit that may be used on both edge and cloud devices.

In an aspect of the present disclosure, a method is disclosed. The method includes receiving in real-time by an analytics logic editor of an analytics system a plurality of user inputs from a computing device associated with a user. The analytics logic editor is configured to construct an analytics logic rule in response to the received inputs. The analytics logic rule specifies a data source, a transform, a rule condition, and an action. The plurality of user inputs includes an activation of a first element of an interface associated with the analytics logic editor. The activation of the first element selects the data source for the analytics logic rule. The plurality of user inputs further includes an activation of a second element of the interface. The activation of the second element selects a transform to be applied to data received from the selected data source. The plurality of user inputs further includes an activation of a third element of the interface. The activation of the third element selects a rule condition to be applied to data that is transformed by the selected transform. The plurality of user inputs further includes an activation of a fourth element of the interface. The activation of the fourth element selects an action to be taken in response to the data that is transformed by the selected transform meeting the selected rule condition. The method further includes constructing the analytics logic rule based on the selected data source, selected transform, selected rule condition, and selected action, and transmitting the constructed analytics logic rule to an edge device. The analytics logic rule is configured for real-time installation and execution by the edge device upon receipt by the edge device.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can best be understood by referring to the accompanying drawings, in which like reference numbers and designations refer to like elements.

FIG. 3 is an illustration of an interface of the analytics logic editor of the system of FIG. 1 according to an aspect of the present disclosure.

FIG. 4 is an illustration of an interface of the analytics logic editor of the system of FIG. 1 according to a further aspect of the present disclosure.

DETAILED DESCRIPTION

The present disclosure relates to the analysis of data generated at the edge, e.g., decentralized devices or sensors connected to a network. In some aspects, data generated or gathered at the edge may be transmitted as raw data to a remote location such as a cloud server for analysis and processing by the cloud server. For example, an edge device such as a temperature sensor may transmit raw temperature data to the cloud server for processing according to a set of rules to determine an action to be taken.

As the technology utilized at the edge improves, processing and other functions that were previously performed exclusively by cloud servers may be offloaded onto the sensors or edge devices themselves or to devices near the edge devices or sensors, for example, onto an analytics gateway positioned between the edge devices or sensors and the cloud server.

One benefit of performing analytics at or near the edge is that the bandwidth usage between the edge and the cloud may be reduced. For example, where the edge generates large amounts of raw data, transmitting all of the raw data to the cloud may be costly in terms of bandwidth usage. Processing or mining the raw data at or near the edge allows the system to identify targeted and useful information from the raw data for subsequent transmission to the cloud without transmitting the entire raw data. By extracting the useful data first at or near the edge, the size of the data to be transmitted to the cloud may be reduced thereby reducing the required bandwidth.

Processing at or near the edge may also reduce the storage requirements at the cloud since cloud servers no longer need to store large volumes of raw data for further processing. Similarly, processing the raw data as it is generated at the edge may also reduce the storage requirements at the edge device, sensor, or analytics gateway since any data that is not targeted or useful, e.g., not relevant, may be discarded at or near the point of generation through processing.

Often each edge device, sensor, or analytics gateway may require separate and distinct programming to handle the processing of raw data. For example, a programmer may be required to write code specifically for an edge device to filter or otherwise process the raw data and identify targeted or useful information from the raw data for later transmission to the cloud. Given the large number of potential edge devices, sensors, or analytics gateways that may be utilized to provide information to the cloud for use in analytics processing, the individual programming of each edge device, sensor, or analytics gateway may be inefficient.

The present disclosure provides systems and methods to allow a user to generate analytics logic rules in real-time in an easy to define manner for real-time distribution to both edge and cloud devices.

Figure 1:
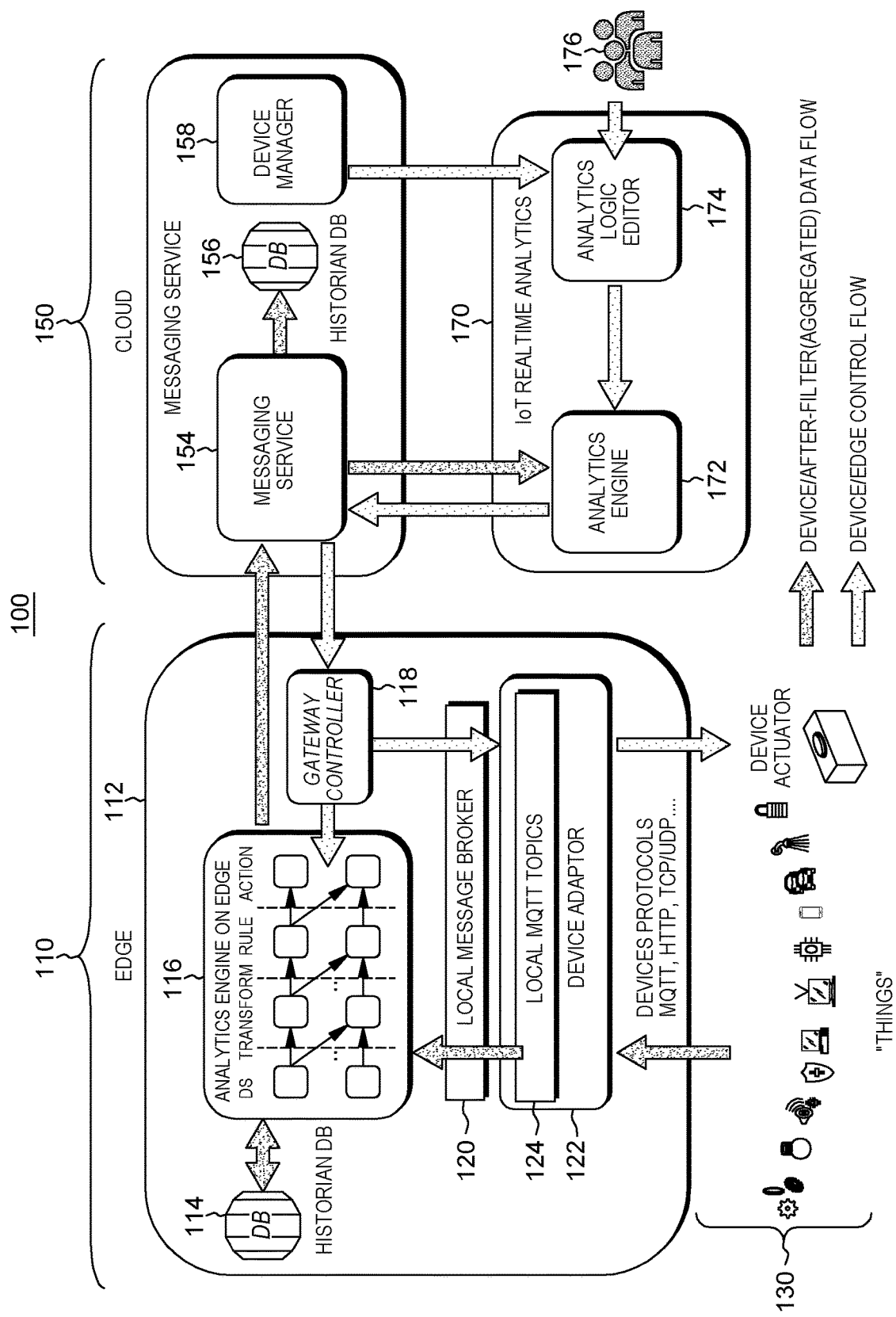
FIG. 1 is a system diagram illustrating a system in accordance with an aspect of the present disclosure.

With reference now to FIG. 1, a system 100 for implementing real-time rule analytics on both the edge 110 and cloud 150 is disclosed.

Edge 110 may include an edge gateway 112 and edge devices 130. Edge gateway 112 may include any device that is configured to perform processing on data generated by edge devices 130. For example, edge gateway 112 may be a local computing device, server, or other similar device that includes the capability to process or filter data generated by edge devices 130 for later transmission to cloud 150. Although described with reference to a single edge gateway 112, the use of any number of edge gateways 112 is contemplated without departing from the scope of the present disclosure.

Edge devices 130 may include any device that is capable of generating data. For example, edge devices 130 may include sensors, monitoring devices, video capture devices, audio capture devices, or any other device that may be used to generate data. In some aspects, edge devices 130 may sometimes be called "things" in the context of the "internet of things" (IoT), e.g., the interconnection via the internet of computing devices embedded in everyday objects to enable the objects to transmit and receive data. In some aspects, edge gateway 112 may be integrated with or formed as a part of an edge device 130. For example, a smart sensor may be an edge device that is capable of both generating data and performing processing or filtering on the generated data for transmission to the cloud 150.

Edge gateway 112 may include a historian database 114, an analytics engine 116, a gateway controller 118, a local message broker 120, and a device adaptor 122.

Historian database 114 may store analytics data related to the edge gateway 112. For example, historian database 114 may store analytics logic rules that are currently in use by the edge gateway 112, analytics logic rules that were previously in use by the edge gateway 112, analytics logic rules that are currently inactive, or any other analytics related data for the edge gateway 112. In some aspects historian database 114 may store a current status of each analytic logic rule that has been installed on the edge gateway 112.

Analytics engine 116 is configured to execute the analytics logic rules that are stored in historian database 114. For example, with reference to FIG. 2, each analytics engine 116 may embody or invoke an atomic analytics logic rule 202 that specifies or defines a data source 204, a transform 206, a rule condition 208, and an action 210 to be applied to received data.

Figure 2:
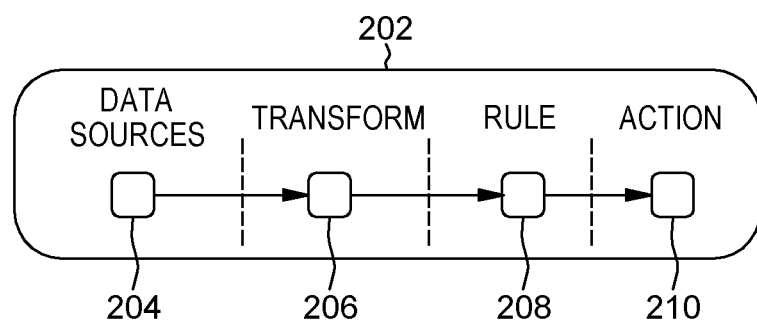
FIG. 2 is a diagram illustrating an analytics logic rule unit according to an aspect of the present disclosure.

With reference now to FIGS. 1-3, data source 204 may include any edge device 130 that generates data or in some aspects, as an edge gateway 112 that has data available for further processing. For example, data source 204 may be defined as an edge device 130 such as a temperature sensor. In some aspects, for example, where an edge device 130 may generate more than one kind of data, the data source 204 of the atomic analytics rule logic 202 may define the edge device 130 and the specific type of data that is to be used for the analytics analysis. In some aspects, data source 204 may define multiple data sources, e.g., more than one edge device 130. In some aspects, for example, each data source 204 or the data generated by the data sources 204 to be used by a particular atomic analytics rule logic unit 202 may be required to be of the same type, e.g., all temperature data sources or temperature data. With reference to FIG. 3, for example, a data source 204 may be identified by a device ID 302, e.g., sysSensor, mysensor2, gateway1_xw, etc., a type of device 304, e.g., engine sensors, gateway, etc., and a class ID 306, e.g., device, gateway, etc.

Referring again to FIGS. 1-3, transform 206 may include any logic for converting raw data generated by the data source 204 into a form usable by the atomic analytics rule logic 202. For example, each edge device 130 may generate data in a different format depending on factors such as how the edge device 130 is configured, programmed, the particular components used by the edge device 130, or any other factors that may affect the format of the generated data. Transform 206 is configured to convert the raw data from the format provided by the data source 204 into a format that is usable by the edge gateway 112 to apply rule conditions 208 to the data. As an example, if the data source generates temperature data in Celsius but the rule condition 208 is defined with regard to temperatures in Fahrenheit, transform 206 may convert the raw data from Celsius to Fahrenheit for use by rule condition 208. In some aspects, transform 206 may also or alternatively define a time dimension for applying the rule condition 208 to the raw data. For example, transform 206 may be defined to only provide transformed data to the rule condition periodically instead of continuously, e.g., every 5 minutes. In some aspects, transform 206 may average the raw data over a period of time, e.g., 5 minutes, and provide the average to the rule condition 208. In some aspects, for example, with reference to FIG. 4, transform 206 may include a variety of processing options that may be applied to transform the data including, for example, notation 402, averaging 404, smoothing 406, mathematical manipulation 408, forecasting 410, or any other transformation.

Figure 5:
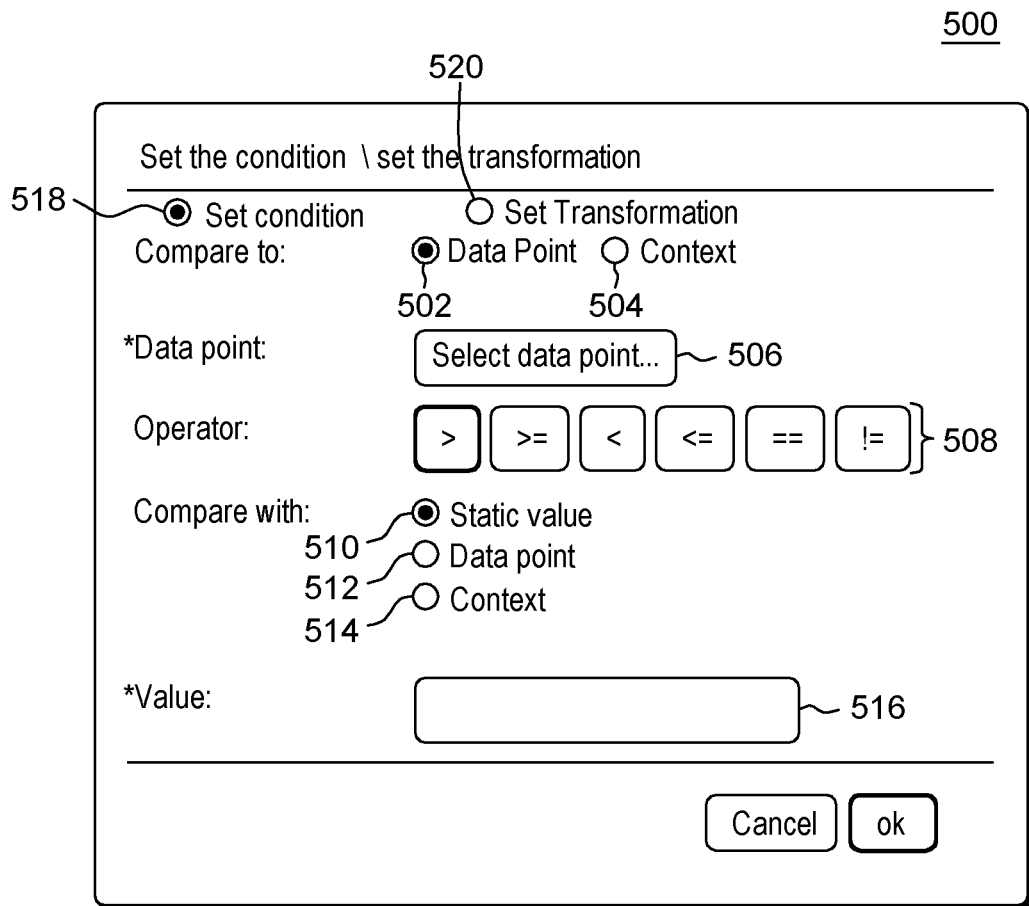
FIG. 5 is an illustration of an interface of the analytics logic editor of the system of FIG. 1 according to a further aspect of the present disclosure.
Figure 6:
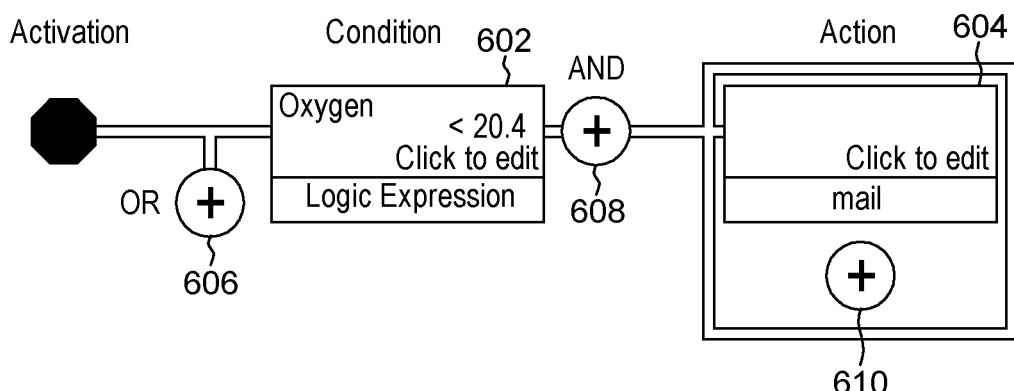
FIG. 6 is an illustration of an interface of the analytics logic editor of the system of FIG. 1 according to a further aspect of the present disclosure.

Rule condition 208 may include rules logic for determining whether a certain condition has been met. With reference to FIG. 5, a rule may include, for example, a data point, an operator, a comparison type (e.g., compare to a static value, compare to a data point, compare to a context, etc.), and a value against which the data point is compared. With reference now to FIG. 6, an example rule condition 602 may include a data point of "oxygen", a less than ("<") operator, a compare with selection of a static value, and a value of "20.4". Thus the example rule condition 602 may be met when the oxygen value received from the data source is less than 20.4 after any transformation, e.g., a transformation to the data received from the data source into an appropriate format that matches the format of the value, for example, converting the data source from degrees Fahrenheit to Celsius if the unit type of the value is also Celsius. In some aspects, FIG. 6 may represent a user interface for constructing an atomic rule unit. For example, a user may activate an "or" +sign 606 to add additional atomic logic rules units. As another example, the user may activate a "and" +sign 608 to add additional conditions for the current atomic logic rules unit, e.g., adding a new condition of temperature >35 to oxygen <20.4. As another example, the user may activate a +sign 610 to add an additional action to be performed if the conditions are met.

Referring again to FIG. 2, action 210 defines an action to be performed when a rule condition is met. For example, if example rule condition 602 (FIG. 6) is met, e.g., the oxygen received from the data source is less than 20.4 after any transformation, an example action may include notifying a nurse, sounding an alarm, activating a medical device, transmitting a mail notification 604 (FIG. 6), sending raw data, data transformed by transform 206, or rule-hit data, e.g., the output of an atomic analytics logic rule unit 202, to the cloud for further processing, or any other responsive action.

Referring again to FIG. 1, gateway controller 118 is configured to manage the transmission and reception of messages or other data to and from the cloud. For example, gateway controller 118 may send any rules received from the cloud to the analytics engine 116, or to device adaptors 122 via local message broker 120 and may send any raw data, transformed data, or outputs of analytics engine 16 to the cloud for further processing.

In an aspect, local message broker 120 may act as an interface between the device adaptor 122 and the analytics engine 116 and gateway controller 118. For example, local message broker 120 may handle the transmission and reception of information, data, actions, or other messages between device adaptor 122 on one side and one or both of analytics engine 116 and gateway controller 118.

Device adaptor 122 is configured for the transmission and reception of data and information between the edge gateway 112 and edge devices 130. In some aspects, device adaptor 122 may be configured to transmit and receive messages in a variety of messaging protocols according to the message protocols in used by each edge device 130. For example, device adaptor 122 may be configured to transmit and receive messages in protocols including Message Queue Telemetry Transport (MQTT), Hypertext Transfer Protocol (HTTP), Transmission Control Protocol (TCP)/User Datagram Protocol (UDP), or other similar messaging protocols as needed. In some aspects, device adaptor 122 may include local MQTT Topics 124 that may be used to categorize the various edge devices 130 that are communicating with the edge gateway 112.

Referring again to FIG. 1, the cloud 150 may include a messaging service system 152 and a real-time analytics system 170.

Messaging service system 152 may include a messaging service 154, historian database 156, and a device manager 158.

Messaging service 154 is configured to transmit and receive communications, data, commands, analytics rules, or other information between messaging service system 152 and real-time analytics system 170 and also between messaging service system 152 and the edge 110, e.g., edge gateway 112. Messaging service 154 is also configured to communicate with historian database 156 to store data received from edge gateway 112, analytics rules received from real-time analytics system 170, or any other information, and to access any data stored on historian database 156.

Historian database 156 is similar to historian database 114 of edge gateway 112 and may store analytics data related to the edge gateway 112 and real-time analytics system 170. For example, historian database 156 may store analytics logic rules that are currently in use by the edge gateway 112, analytics logic rules that were previously in use by the edge gateway 112, analytics logic rules that are currently inactive, or any other analytics related data for the edge gateway 112. In some aspects historian database 114 may store a current status of each analytic logic rule that has been installed on the edge gateway 112. Historian database 156 may also store analytics logic rules that are currently in use by real-time analytics system 170, analytics logic rules that were previously in use by real-time analytics system 170, analytics logic rules that are currently inactive, or any other analytics related data for real-time analytics system 170. In some aspects historian database 156 may store a current status of each analytic logic rule that has been installed on real-time analytics system 170. In some aspects, historian database 156 may also store any data received from edge gateway 112 including, for example, raw data generated by edge devices 130, preprocessed data output by analytics engine 116 of edge gateway 112, or any other data on which analytics may be performed by real-time analytics system 170. For example, messaging service 154 may receive the data from edge gateway 112 and store the data in historian database 156.

Device manager 158 is configured to manage the edge devices that are associated with messaging service system 152. For example, any edge gateways 112 and edge devices 130 that are or have been in communication with messaging service system 152, for example via messaging service 154 may be catalogued and managed by device manager 158. For example, device manager 158 may store a list of all edge gateways 112 and edge devices 130 for use by real-time analytics system 170.

With continued reference to FIGS. 1 and 2, real-time analytics system 170 includes an analytics engine 172 and an analytics logic editor 174.

Analytics engine 172 is configured to implement and execute analytics logic rules in a similar manner as analytics engine 116 of edge gateway 112. For example, analytics engine may execute atomic analytics logic rules 202 in a similar manner to analytics engine 116.

Analytics logic editor 174 includes an interface that is accessible by users 176 to construct custom atomic analytics logic rules 202 for implementation by analytics engines 116 and 172 without requiring users to individually program device specific code for each edge device 130, edge gateway 112, or real-time analytics system 170. The analytics logic editor 174 implements a single source unified programming model that provides a user with a way to control the processing of data on both the edge 110 and cloud 150 in an easy to use manner. In some aspects, for example, rules constructed using analytics logic editor 174 may be pushed or propagated to both the edge 110 and cloud 150, e.g., to edge gateways 112, edge devices 130, messaging service system 152, and analytics engine 172.

With reference again to FIG. 1-3, analytics logic editor 174 may implement an example interface 300 for selecting a data source 204 of a custom atomic analytics logic rule 202. As described above, interface 300 includes an array of fields such as device ID 302, type of device 304, and class ID 306. In some aspects, fields 302, 304, and 306 may be populated based on data received from device manager 158, for example, any connected edge gateways 112 and edge devices 130. In some aspects, a user of analytics logic editor 174, e.g., users 176, may activate elements 308 that correspond to each edge gateway 112, edge device 130, cloud based data source 204 or any other data source 204 to select that data source 204 as a data source 204 for use in a new atomic analytics logic rule 202. For example, a user may activate an element 310 to select the edge device having the device ID 302 of sysSensor as a data source 204. In some aspects, the user 176 may activate more than one element 308 to select more than one data source 204 for use with a single atomic analytics logic rule 202.

With reference again to FIGS. 1, 2 and 4, analytics logic editor 174 may implement an example interface 400 for selecting a transform 206 of a custom atomic analytics logic rule 202. Interface 400 identifies a payload name 412 and label 414, e.g., for the data source 204 selected using interface 300 (FIG. 3). A type of the payload (e.g., raw data received from the data source 204) to be received from the selected data source 204 may be set using an element 416, e.g., string, integer, or other similar types. In some aspects, the type of payload may be automatically set, for example, based on the type of the data source. Element 416 may, for example, be a drop down menu providing a selection of data types.

In some aspects, the user may set payload properties 418 and notations 402 to be applied to the payload. In some aspects, for example, a payload property may include a raw data property, e.g., a value, and a transformed property, e.g. an operator. The raw data property may identify the meaning of the data received from the device. The transform property may define the transform to be applied to the raw data property.

In some aspects, for example, the raw data property may include a "value" that may be set by activation of a value element 420, e.g., value element 420 may be activated to set a raw data property value of "2" or any other value.

In some aspects, the transform property may include one or more operations that may be set by the activation of one of operation elements 422. For example, the user may activate a combination of value elements 420 and operation elements 422 as payload properties 418 to define a formula to be applied to the payload. As an example, the user may activate value elements 420 and operation elements 422 to define a formula of (payload+2)/3. As another example, the user may activate value elements 420 and operation elements 422 to define a formula f=payload*9/5+32 to transform Celsius to Fahrenheit.

The selected payload properties 418 may be presented in a calculation summary 424 for confirmation by the user 176.

Notations 402 may be used to further transform the result of the payload properties 418. For example, notations 402 may include elements 404, 406, 408, and 410 that are activatable to apply transforms such as, e.g., averaging functions, smoothing functions, mathematical functions, forecasting functions, or any other transform. For example, the user may define a transform to compute "averaged" temperature every 5 minutes by activating element 404 to apply an average function. As another example, the user can define a transform math.sin(payload) by activating element 408 to apply a mathematical function. As another example, the user may define a transform to perform averaging on a time domain to compute average temperature by activating element 404 to apply an averaging function. As another example, the user may define a transform to smooth the time series curve to remove noise in the raw data by activating element 406 to apply smoothing. As another example, the user may define a transform to predict the data trend based on historical and current incoming data by activating element 410 to apply forecasting.

With reference again to FIGS. 1, 2 and 5, analytics logic editor 174 may implement an example interface 500 for selecting a rule or condition of a custom atomic analytics logic rule 202. In some aspects, interface 500 includes a user selectable element 502 that is activatable by a user to configure the data type as a data point and a user selectable element 504 that is activatable to configure the data type as a context. For example, the context may include at least one type of data schema such as an asset schema, weather schema, or any other data type. In some aspects, for example, the context property may be pre-loaded. In some aspects, for example, an asset schema may include an asset ID, asset tag, asset location, asset value, or other similar parameters. In some aspects, for example, when a user activates element 504 to select a context, a list of schema and the corresponding properties may be listed for further selection by the user. The rule may then be defined in part by selecting the corresponding property, for example, a rule may be defined to perform an action if the asset ID=12345. It is contemplated that other elements may also be included that are activatable to configure the data type to other types of data without departing from the scope of the present disclosure.

In some aspects, where element 502 was activated for example, the user may further activate a data point element 506 to select the target data point, e.g., the data source 204 or a payload property 418 (FIG. 4).

In some aspects, the user may activate one of operator elements 508 to select an operator to be used with the selected data point as part of the condition logic. For example, the user may activate an operator element 508 corresponding to greater than (">"), greater than or equal to (">="), less than ("<"), less than or equal to ("<="), equal to ("=="), not equal to ("!="), or any other operator that may be used to for comparison of a data point.

In some aspects, the user may activate a compare with element 510 to select a static value for comparison to the selected data point using the selected operator, or a compare with element 512 to select another data point for comparison to the selected data point using the selected operator, or a compare with element 514 to select a context to compare to the selected data point using the selected operator. Any other compare with element may be implemented for the selection of any other item of data for comparison to the selected data point using the selected operator.

In some aspects, the user may enter a value in a field 516 of interface 500 for use in comparison with the selected data point using the selected operator. For example, in some aspects the field 516 may be active for receiving a value when the compare with element 510 for selecting a static value has been selected. In some aspects, field 516 may be replaced with another activatable element (not shown) for selection of a data point or context when one of compare with elements 512 or 514 is activated.

In some aspects, the user may switch between interface 500 and interface 400 by activating one of set condition element 518 and set transformation element 520.

Figure 7:
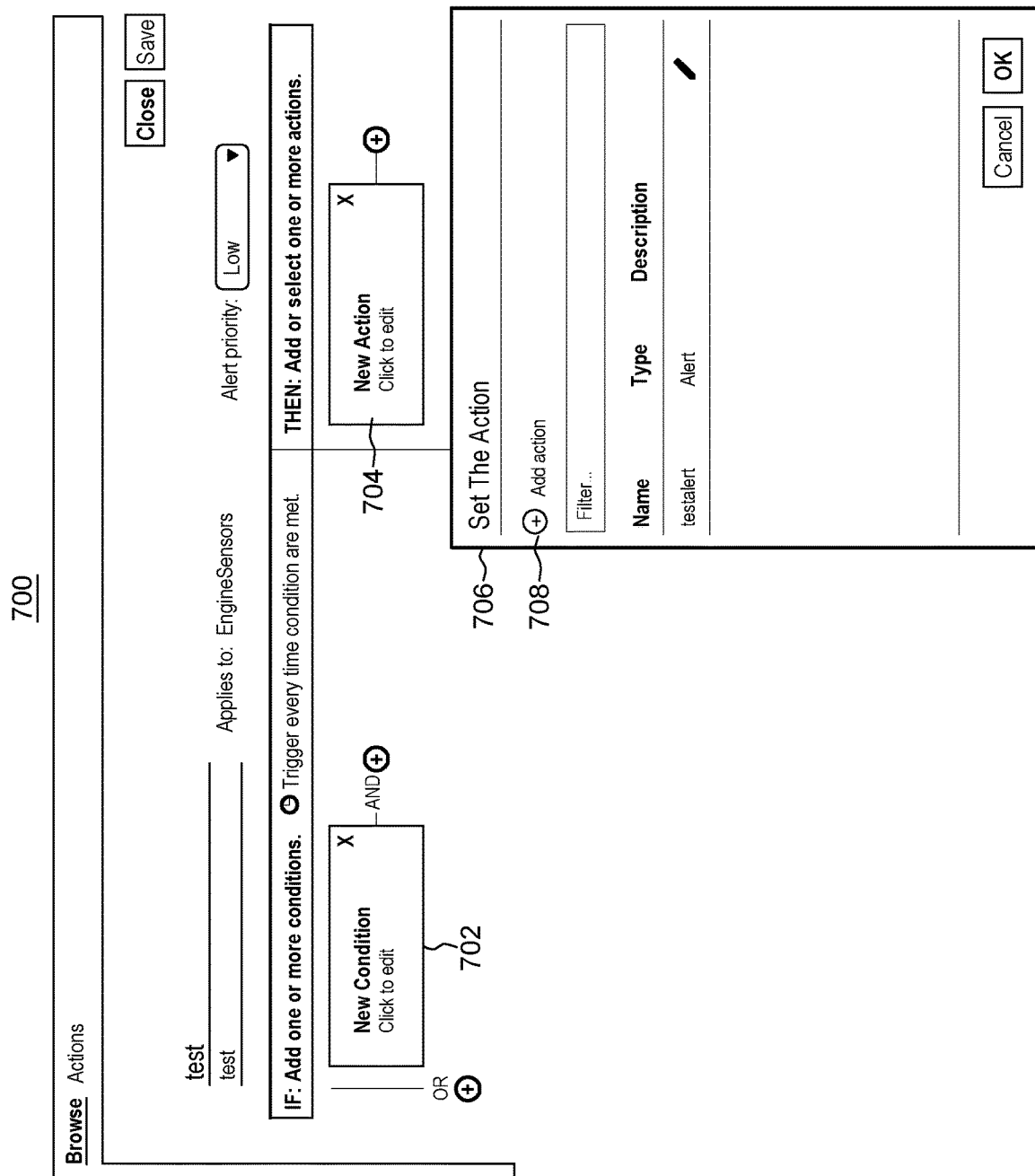
FIG. 7 is an illustration of an interface of the analytics logic editor of the system of FIG. 1 according to a further aspect of the present disclosure.

With reference now to FIGS. 1, 2, and 7, analytics logic editor 174 may implement an example interface 700 for constructing an atomic analytics logic rule 202. Interface 700 includes new condition element 702 that is activatable by a user 176 to add a new condition to a rule, for example, via interface 500. For example, activation of new condition element 702 may cause an analytics logic editor 174 to present interface 500 to the user 176, for example, via a display of a computing device of the user 176.

In some aspects, interface 700 may be configured to display a new action element 704 that is activatable by a user 176 to cause analytics logic editor 174 to present an interface 706 for constructing an action of the atomic analytics logic rule 202. For example, interface 706 may include an add action element 708 that is activatable to create a new action. For example, the user may activate add action element 708 to add a new action such as sending an alert to an e-mail address, sending device data to the cloud, notifying the user by an alarm, or any other action. The newly created action may then be selected for use by activation of new action element 704.

In some aspects, the user 176 may designate or flag a destination for the constructed atomic analytics logic rule 202. For example, the user may designate that the constructed atomic analytics logic rule 202 be used on the cloud 150, on the edge 110, or both. In some aspects, for example, the user 176 may specify the particular edge gateways 112, edge devices 130, analytics engine 172 or other targets for executing the constructed atomic analytics logic rule 202. In some aspects, for example, the user 176 may specify that the atomic analytics logic rule 202 be provided for installation on any of analytics engine 172, edge gateways 112, and edge devices 130. For example, the user 176 may set a flag associated with the constructed atomic analytics logic rule 202 in analytics logic editor 174 that specifies cloud only, edge only, or both cloud and edge.

In some aspects, the user 176 may control or specify the distributions of the atomic analytics logic rule 202 using analytics logic editor 174. For example, the user 176 may specify that the atomic analytics logic rule 202 be distributed to the relevant devices. In some aspects, for example, a user 176 of analytics logic editor 174 may trigger the activation or de-activation of the atomic analytics logic rule 202 after it has already been distributed or deployed to the relevant devices. For example, upon initial deployment and installation at the relevant devices, the atomic analytics logic rule 202 may be in an inactive state. The user may then access analytics logic editor 174 to activate the atomic analytics logic rule 202 for execution. Likewise, the user may also access analytics logic editor 174 to deactivate the atomic analytics logic rule 202 when the user no longer wishes for the atomic analytics logic rule 202 to be actively executed by the relevant device, e.g., edge device 130, edge gateway 112, or analytics engine 172.

In some aspects, the analytics logic editor 174 may present the user with a status of the atomic analytics logic rule 202 on the relevant device, e.g., edge device 130, edge gateway 112, or analytics engine 172. For example, the status, e.g., distributed, installed, active, inactive, deactivated, or other similar statuses, may be presented to the user 176 via analytics logic editor 174 and the user may be given the option to change the status, for example, as described above by activating, deactivating, causing distribution, etc. For example, an element (not shown) in analytics logic editor 174 may be activatable by a user to change the status.

Figure 8:
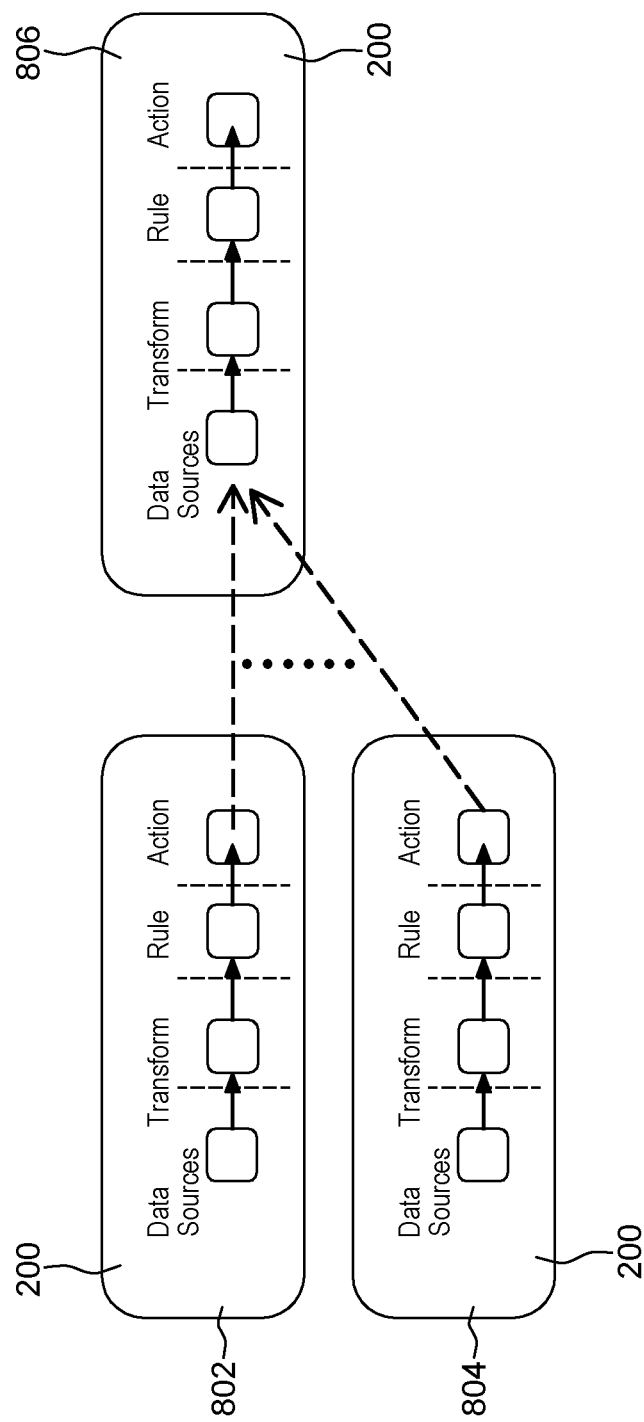
FIG. 8 is a diagram illustrating the combination of two analytics logic rule units into one analytics logic rule unit according to an aspect of the present disclosure.

With reference now to FIGS. 1, 2, and 8, in some aspects, atomic analytics logic rules 202 may be merged together for form a single atomic analytics logic rule 202. For example, analytics engine 116 or analytics engine 172 may merge atomic analytics logic rules 202 together when the atomic analytics logic rules 202 have similar features, e.g., data sources 204, rule conditions 208, or other features. For example, where two atomic analytics logic rules 202, e.g., atomic analytics logic rule 802 and atomic analytics logic rule 804 are installed on the same device, e.g., edge gateway 112, edge device 130, or analytics engine 172, they may be combined to for a single atomic analytics logic rule 806. In some aspects, this merging of atomic analytics logic rules 202 may occur when the data source 204 is the same, e.g., both atomic analytics logic rule 802 and atomic analytics logic rule 804 have the same data source 204. For example, both atomic analytics logic rule 802 and atomic analytics logic rule 804 may have a data source 204 of the same oxygen sensor.

In some aspects, this merging of atomic analytics logic rules 202 may occur when the data source 204 is of the same type and have the same rule condition 208. For example, the merging may occur if both atomic analytics logic rule 802 and atomic analytics logic rule 804 have a data source 204 of the type, e.g., oxygen sensor, and the same rule, e.g., oxygen<20.4.

Figure 9:
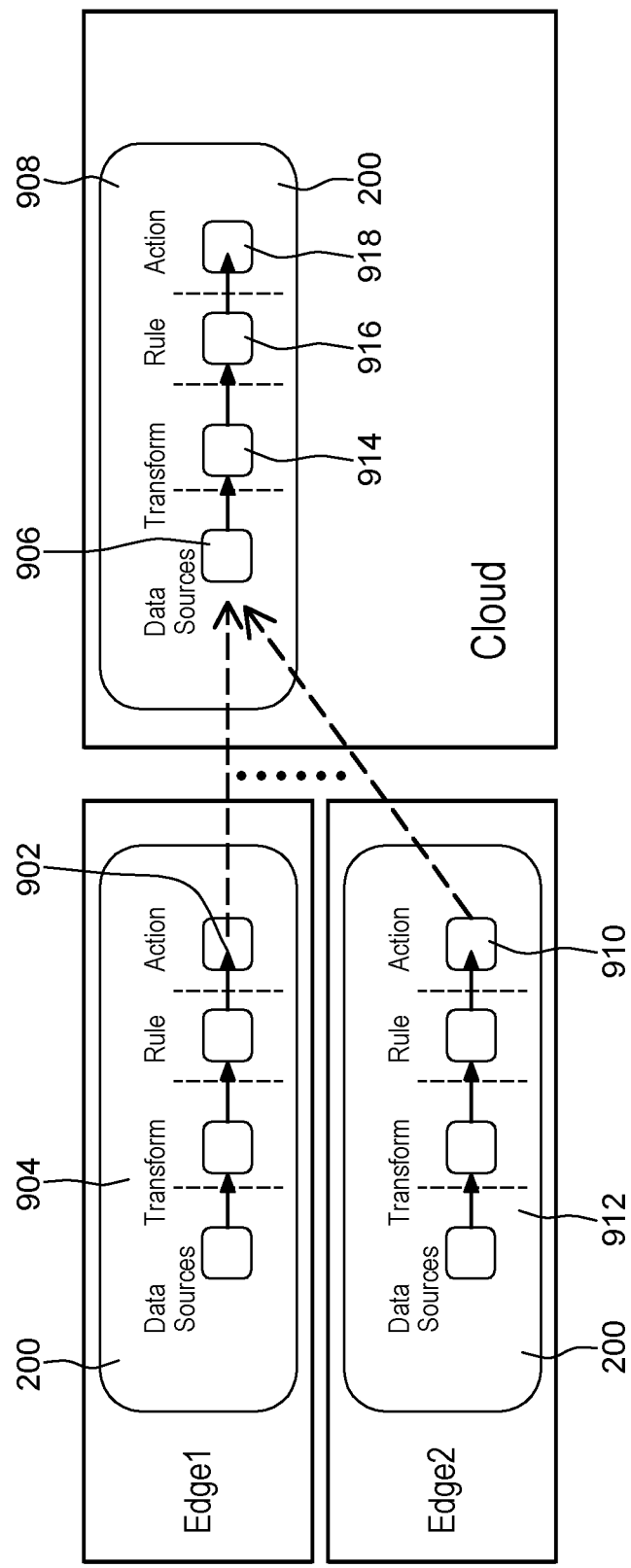
FIG. 9 is a diagram illustrating the use of the selected actions of two analytics logic rule units installed on the edge as selected data sources for an analytics logic rule unit installed on the cloud according to an aspect of the present disclosure.

With reference now to FIGS. 1, 2 and 9, in some aspects the actions 202 output by multiple atomic analytics logic rules 202 from the edge 110, e.g., from edge gateways 112 or edge device 130, may be used as data sources 204 for the same atomic analytics logic rule 202 executing on the cloud 150, e.g., at analytics engine 172. For example, an action 902 of an atomic analytics logic rule 904 on a first edge gateway 112 or edge device 130 may be used as a data source 906 for an atomic analytics logic rule 908 executing on cloud 150. Likewise, the action 910 of an atomic analytics logic rule 912 on a second edge gateway 112 or edge device 130 may also be used as a data source 906 for atomic analytics logic rule 908 executing on cloud 150. For example, the atomic analytics logic rule 908 may perform transformations 914, apply rule conditions 916, and output actions 918 using both actions 902 and 910 as the data source 906.

Figure 10:
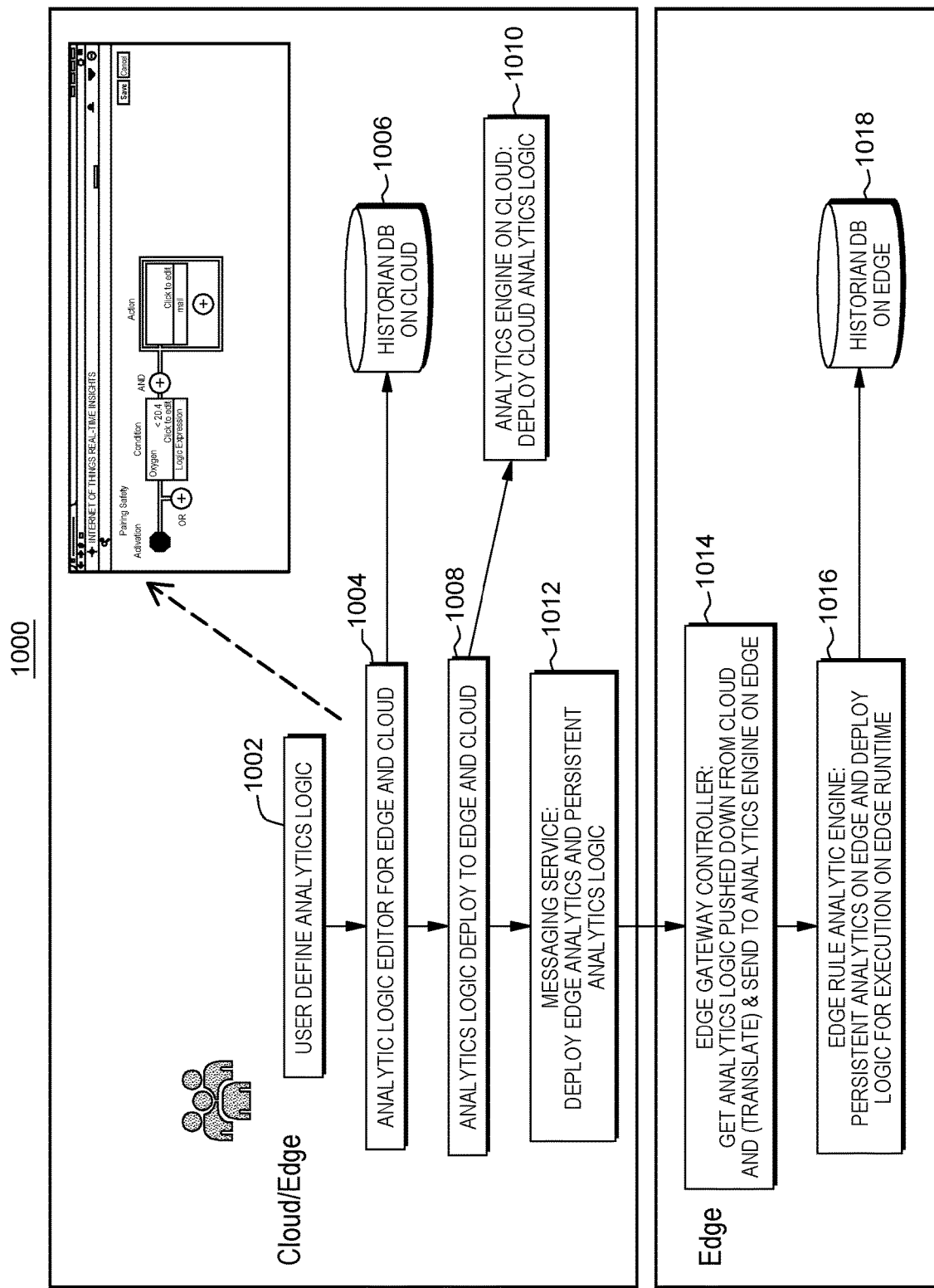
FIG. 10 is a flow chart of a method according to an aspect of the present disclosure.

Referring now to FIG. 10, in an aspect of the present disclosure, an example flowchart 1000 for the definition and distribution of analytics logic is illustrated with further reference to FIGS. 1-6.

At 1002 a user, e.g., user 176 accesses analytics logic editor 174 to construct an atomic analytics logic rule 202 in real-time as described above.

At 1004, analytics logic editor 174 generates the atomic analytics logic rule 202 based on the activations and selections made by user 176, for example, via interfaces 300, 400, 500, and 700.

At 1006, the atomic analytics logic rule 202 generated by the analytics logic editor 174 is stored in the historian database 156 on the cloud 150.

At 1008, the atomic analytics logic rule 202 generated by the analytics logic editor 174 is deployed to the edge 110 and cloud 150 in real-time, e.g., to analytics engine 172, edge gateway 110, and edge device 130. In some aspects, the user 176 may designate one or both of the edge 110 and cloud 150 for deployment.

At 1010, the atomic analytics logic rule 202 is provided to analytics engine 172 on the cloud 150. Analytics engine 172 may install the atomic analytics logic rule 202 and prepare for execution using the data source 204 designated in the atomic analytics logic rule 202. The installation may occur in real-time without requiring a restart of the analytics engine 172.

At 1012, messaging service 154 transmits the atomic analytics logic rule 202 to edge gateway controller 118 for deployment to edge gateway 110 and edge devices 130.

At 1014, edge gateway controller 118 receives the atomic analytics logic rule 202 and sends the analytics logic rule 202 to analytics engine 116.

At 1016, analytics engine 116 installs the atomic analytics logic rule 202 in real-time and prepares for execution of the atomic analytics logic rule 202 using data from the designated data source 204 in the atomic analytics logic rule 202. In some aspects, the analytics engine 116 may install and execute the atomic analytics logic rule 202 in real-time without stopping the processing and execution of other logic runes.

At 1018, the atomic analytics logic rule 202 may also be stored in the historian database 114 of the edge gateway 112.

Figure 11:
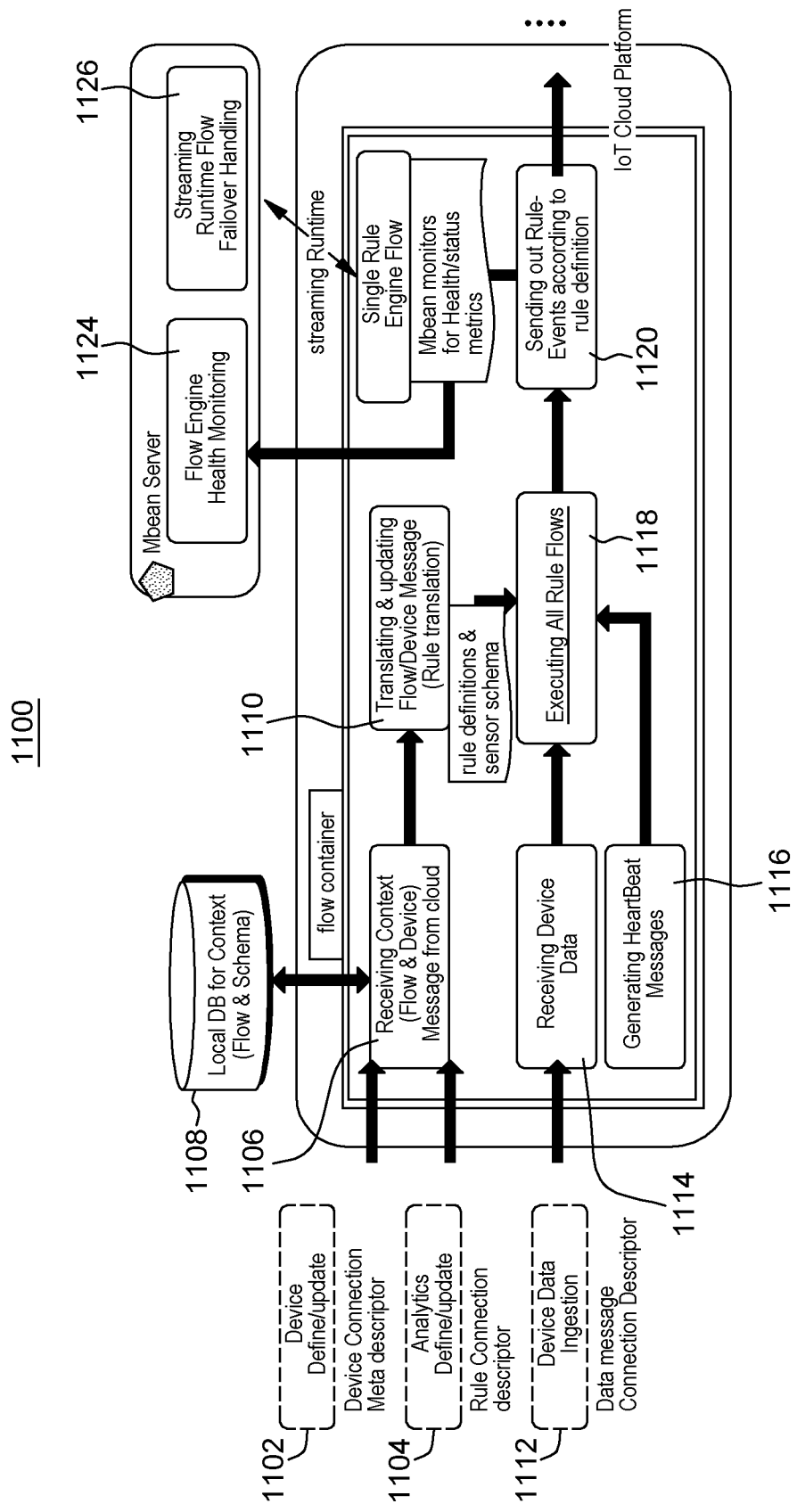
FIG. 11 is a flow chart of another method according to an aspect of the present disclosure.

Referring now to FIG. 11, in an aspect of the present disclosure, an example flowchart 1100 of an example edge side implementation is illustrated with further reference to FIGS. 1-6.

At 1102, messaging service 154 transmits a device connection meta descriptor, e.g., a MQTT message, to the edge 110, e.g., edge gateway 112 or edge device 130. The device connection meta descriptor includes data identifying a target edge gateway 110 or edge device 130 for installation of a constructed atomic analytics logic rule 202. In some aspects, for example, the device connection meta descriptor describes how gateway device 112 or edge device 130 can receive the raw device data and how to recognize the data that is received. When the device connection meta descriptor is installed on the analytics engine 116, for example, the analytics engine gains the capability to parse and the raw data received from the associated device.

At 1104, cloud 150, e.g., messaging service 154, transmits a rule connection descriptor, e.g., a MQTT message, to the edge 110, e.g., edge gateway 112 or edge device 130. The rule connection descriptor includes an atomic analytics logic rule 202 constructed by a user 176 for implementation on the edge 110.

At 1106, the edge 110, e.g., edge gateway 112 or edge device 130, receives the device connection meta descriptor and rule connection descriptor from cloud 150, e.g., from messaging service 154.

At 1108, the historian database 114 on the edge stores the data from the received device connection meta descriptor and the atomic analytics logic rule 202 from the received rule connection descriptor.

At 1110, the edge gateway 112 or edge device 130 translates and updates the received atomic analytics logic rule 202 for installation and execution by the edge gateway 112 or edge device 130. For example, analytics engine 116 may receive meta descriptor from 1102 and gain the capability to translate or parse any data received from the target edge device at 1112 and may receive the rule connection descriptor from 1104 which defines the rule to be applied to the data received from the target edge device at 1112.

At 1112, a raw data is generated and provided or transmitted to edge gateway 112 or edge device 130, in a data message connection descriptor, e.g., a MQTT message. For example, the raw data may be generated by a sensor on the edge 110, e.g., by a sensor associated with an edge gateway 112, by an edge device 130 or by any other data source 204.

At 1114, the data message connection descriptor is received by the edge gateway 112 or edge device 130. For example, in some aspects an edge gateway 112 may receive data message connection descriptor from an edge device 130 that generates raw data. In some aspects, an edge device 130 that is configured to process data and execute atomic analytics logic rules 202 may both generate and receive the raw data at 1112 and 1114.

At 1116, the edge gateway 112 or edge device 130 sends heartbeat messages that monitor the health of the atomic analytics logic rule 202 to analytics engine 116. For example, the heartbeat messages may include an indication of whether the rules are executing properly, if there are any error conditions, or any other health related status of the atomic analytics logic rule 202 or analytics engine 116.

At 1118, analytics engine 116 executes the logic of the atomic analytics logic rule 202 on the raw data from the data message connection descriptor.

At 1120, the outcome of the executed logic is transmitted to messaging service 154 on the cloud 150 based on the actions set in the analytics logic rule 202.

At 1122, the Mbean monitors the health and status metrics of the analytics engine 116 to determine whether the atomic analytics logic 202 has executed properly and whether analytics engine 116 has encountered any failures or anomalies. For example, Mbean may monitor the executions of atomic analytics logic rules 202 by analytics engine 116 to determine whether a failure has occurred either in the atomic analytics logic rules 202 or the analysis engine 116 itself. In some aspects, for example, the Mbean monitoring may track statistics including last heart beat, byte in and byte out, and other similar characteristics of the execution by analytics engine 116.

At 1124, the monitoring output, e.g., the status of atomic analytics logic rules 202 and analysis engine 116, may be transmitted to an Mbean server for monitoring the flow of the analytics engine 116.

At 1126, when a failure has occurred, the failure may be handled by streaming runtime flow failover handling by the Mbean server. For example, the MBean server may determine that a failure has occurred based on the Mbean status messages and may handle the failure, for example, by restarting the analytics engine 116 or the flow of data to the analytics engine 116.

Figure 12:
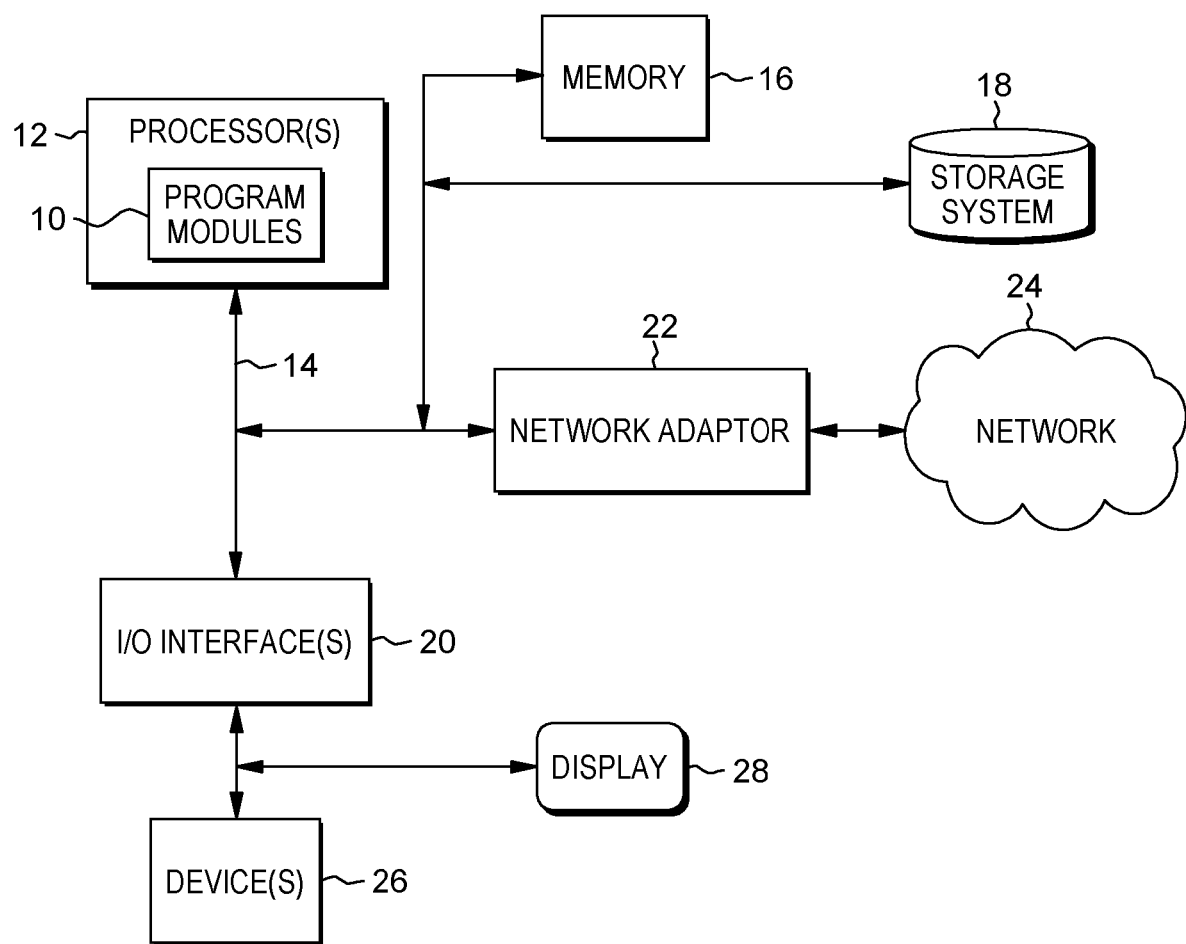
FIG. 12 is an exemplary block diagram of a computer system in which processes involved in the system, method, and computer program product described herein may be implemented.

FIG. 12 illustrates a schematic of an example computer or processing system that may implement any portion of system 100, edge 100, edge gateway 112, edge devices 130, cloud 150, messaging service system 152, real-time analytics system 170, analytics engine 116, analytics engine 172, analytics logic editor 174, computing devices associated with users 176, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system.

Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
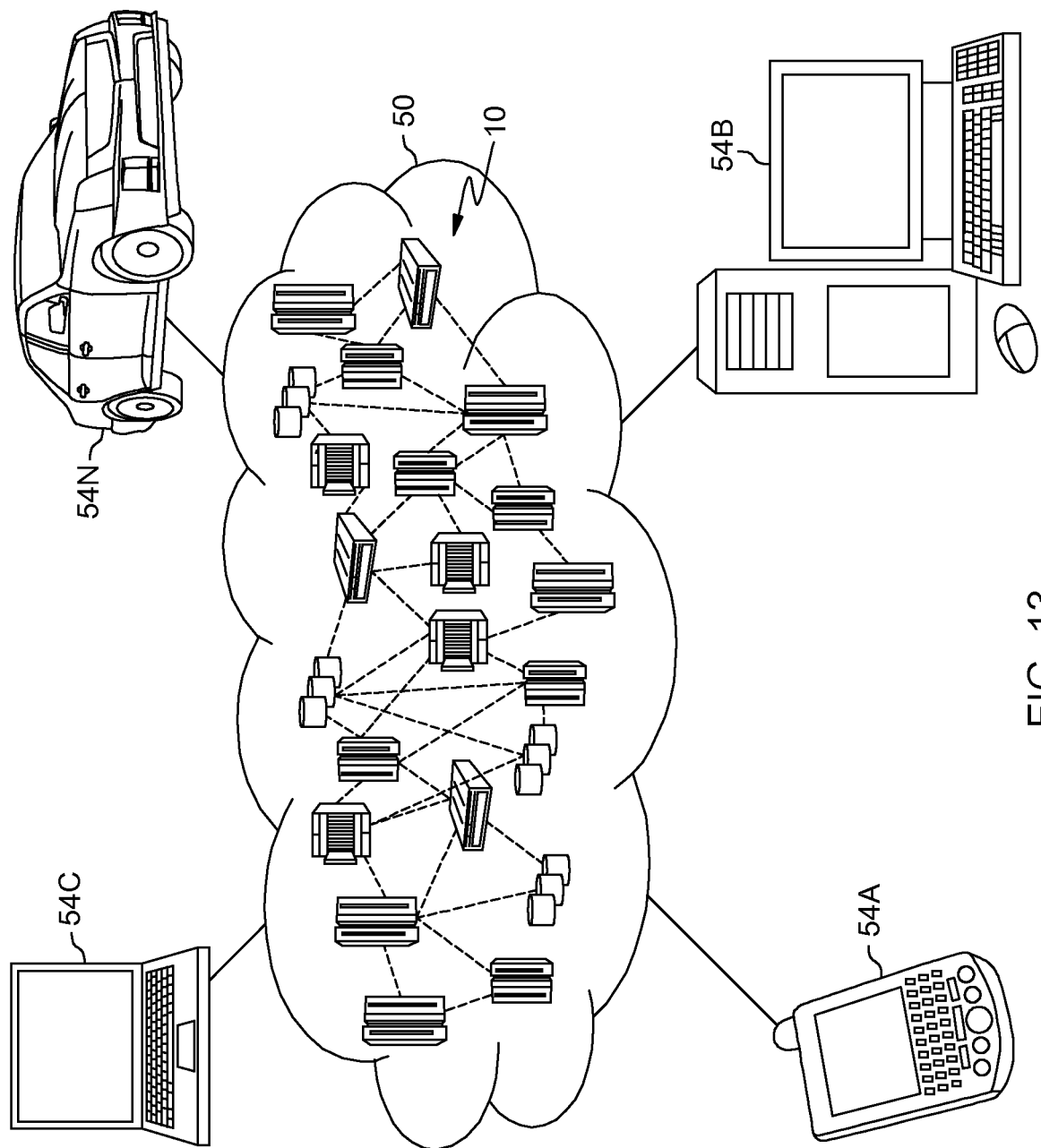
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
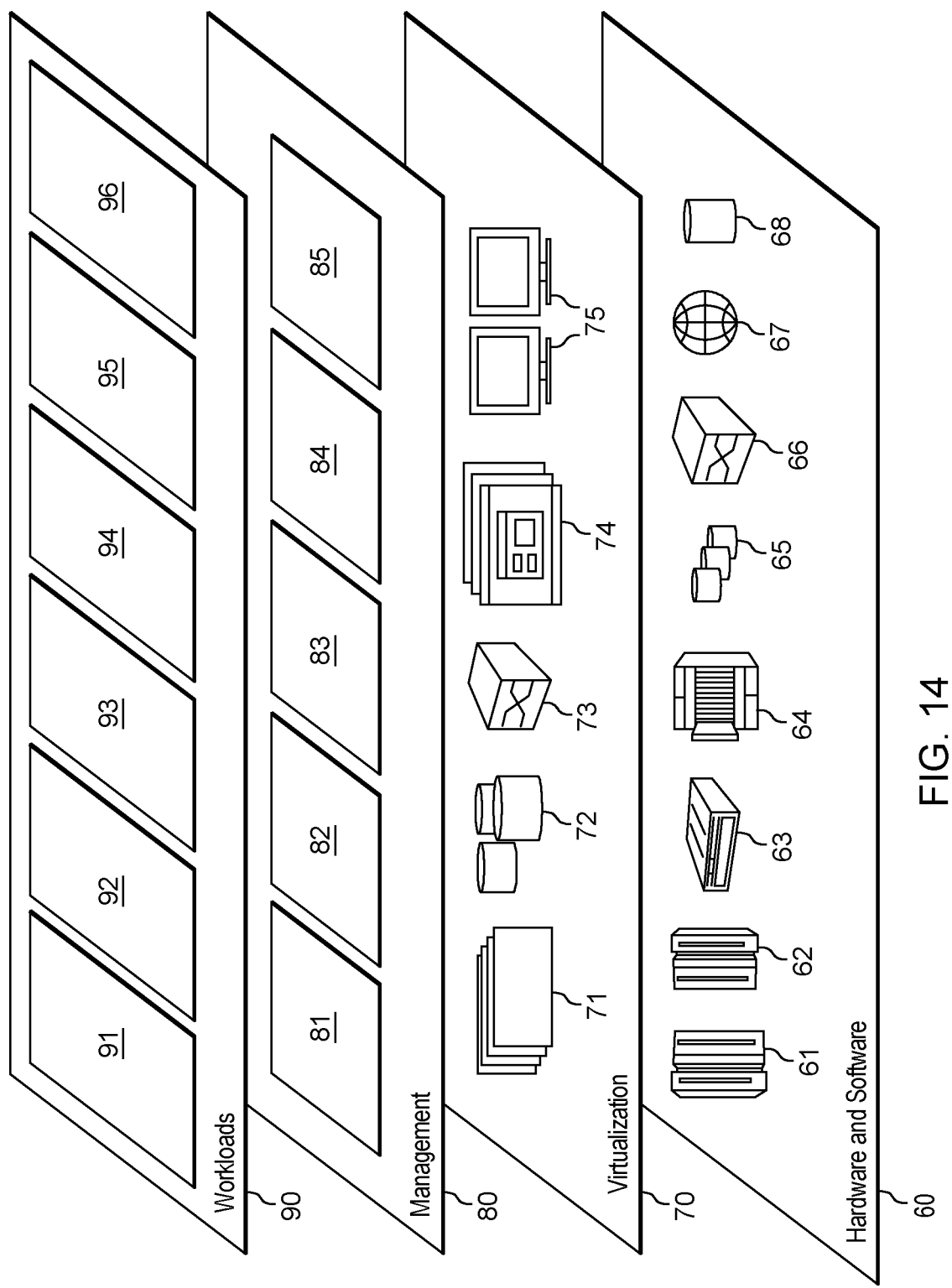
FIG. 14 depicts abstraction model layers according to an embodiment of the present invention.

Referring now to FIG. 14, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analytics logic editing 96.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor comprising:

receiving in real-time by an analytics logic editor of an analytics system a plurality of user inputs from a computing device associated with a user, the analytics logic editor configured to construct an analytics logic rule in response to the received inputs, the analytics logic rule specifying a data source, a transform, a rule condition, and an action, the plurality of user inputs comprising:

an activation of a first element of an interface associated with the analytics logic editor, the activation of the first element selecting the data source for the analytics logic rule;

an activation of a second element of the interface, the activation of the second element selecting a transform function to be applied to data received from the selected data source;

an activation of a third element of the interface, the activation of the third element selecting a rule condition to be applied to data that is transformed by the selected transform function, wherein the selecting a rule condition for the constructed analytics logic rule comprises: receiving, via a first user selectable interface element, a selection of a data type as one of: a data point or a context; receiving, via a second user selectable interface element, a selection of an operator for operating upon one of a selected data point or context; and receiving, via a third user selectable interface element, a respective data point value or context value activatable for use in comparing the data using a selected operator;

an activation of a fourth element of the interface, the activation of the fourth element selecting an action to be taken in response to the data that is transformed by the selected transform function meeting the selected rule condition;

constructing the analytics logic rule as a single atomic analytic logic rule unit specifying the selected data source, the selected transform function to be applied to data received, the selected rule condition to be applied to data that is transformed, and the selected action to be taken in response to the data that is transformed;

setting, via said analytics logic editor, a flag associated with the constructed analytics logic rule for designating a destination device for deploying the constructed analytics logic rule; and transmitting the constructed analytics logic rule to an edge device, a cloud device, or both the edge device and cloud device responsive to the associated flag setting, the analytics logic rule configured for real-time installation and execution by an analytics engine at the edge device, the cloud device or both the edge device and the cloud device upon a respective receipt thereof.

2. The method of claim 1, further comprising constructing a second analytics logic rule based on a second plurality of user inputs, the second analytics logic rule comprising a selected data source, selected transform function, selected rule condition, and selected action, the selected data source of the second analytics logic rule comprising the selected action of the constructed analytics logic rule.

3. The method of claim 2, further comprising:
receiving data from the edge device, the data comprising an output of the selected action of the analytics logic rule; and
executing the second analytics logic rule by an analytics engine residing on a cloud device based on the received data from the edge device.

4. The method of claim 2, wherein the selected data source of the second analytics logic rule comprises the selection action of the constructed analytics logic rule and a selected action of at least a constructed third analytics logic rule.

5. The method of claim 1, further comprising:
constructing a second analytics logic rule based on a second plurality of user inputs, the second analytics logic rule comprising a selected data source, selected transform function, selected rule condition, and selected action; and transmitting the second analytics logic rule to the edge device, the second analytics logic rule configured for real-time installation and execution by the edge device upon receipt by the edge device, wherein the second analytics logic rule is configured for combination with the analytics logic rule by the edge device to form a third analytics logic rule, the third analytics logic rule comprising:
a data source comprising the selected data source of the analytics logic rule and the selected data source of the second analytics logic rule;
a transform comprising the selected transform function of the analytics logic rule and the selected transform function of the second analytics logic rule;
a rule condition comprising the selected rule condition of the analytics logic rule and the selected rule condition of the second analytics logic rule; and
an action comprising the selected action of the analytics logic rule and the selected action of the second analytics logic rule.

6. The method of claim 1, wherein the constructed analytics logic rule is deployed to a device in an inactive state, said method further comprising:
triggering, by a user, via the analytics logic editor, an activation of the constructed analytics logic rule after it has already been deployed to the edge device, cloud device, or both edge and cloud devices.

7. The method of claim 6, further comprising:
triggering, by a user, via the analytics logic editor, a de-activation of the constructed analytics logic rule deployed at the edge device, cloud device, or both edge and cloud devices.

8. The method of claim 1, wherein responsive to user selecting of a context, the method further comprising: listing, via said interface, a data schema and corresponding properties for user selection.

9. The method of claim 8, wherein a type of said data schema comprises an asset schema.

10. The method of claim 9, wherein the asset schema comprises a context property selected from: an asset ID, an asset tag, an asset location parameter, or an asset value.

11. The method of claim 10, wherein the context property is pre-loaded.

12. The method of claim 1, wherein the transform function comprises one selected from a group comprising: averaging functions, smoothing functions, mathematical functions, and forecasting functions.

* * * * *